United States Patent

[11] 3,563,273

[72] Inventor Carl R. Mills
 2626 Diamond Court, Downers Grove, Ill. 60515
[21] Appl. No. 771,173
[22] Filed Oct. 28, 1968
[45] Patented Feb. 16, 1971

[54] ACTUATOR VALVE
 6 Claims, 6 Drawing Figs.
[52] U.S. Cl. .................................................... 137/625.69,
 251/320; 91/306, 91/313
[51] Int. Cl. ..................................................... F16k 11/07,
 F011 25/04
[50] Field of Search ........................................... 137/596.18,
 625.6, 625.66, 625.67, 625.68, 625.69; 91/305,
 306, 313, 448; 251/12, 320

[56] References Cited
 UNITED STATES PATENTS
 2,888,951 6/1959 Flick ............................ 137/596.18
 2,979,080 4/1961 Hewitt ......................... 137/625.69X
 3,348,803 10/1967 Churchill ..................... 91/313X

*Primary Examiner*—Henry T. Klinksiek
*Attorney*—Hofgren, Wegner, Allen, Stellman & McCord

ABSTRACT: An actuator valve for a fluid control used in reciprocating or sequence operations of fluid operated devices. The valve is characterized by a simplified spool structure reciprocated by an actuating stem projecting into a cylinder cavity containing the spool. The valve is a three way valve in that it alternately connects a pilot port to an air supply port, or to an exhaust port in response to spool reciprocation.

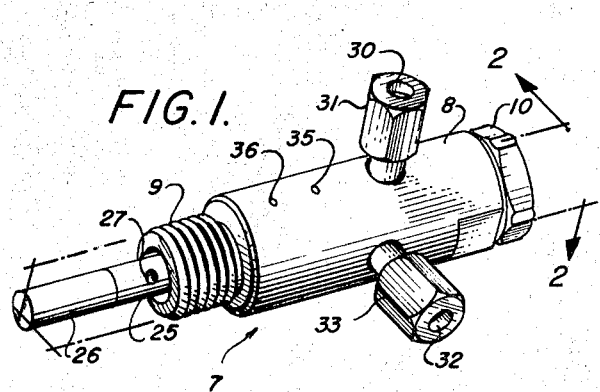
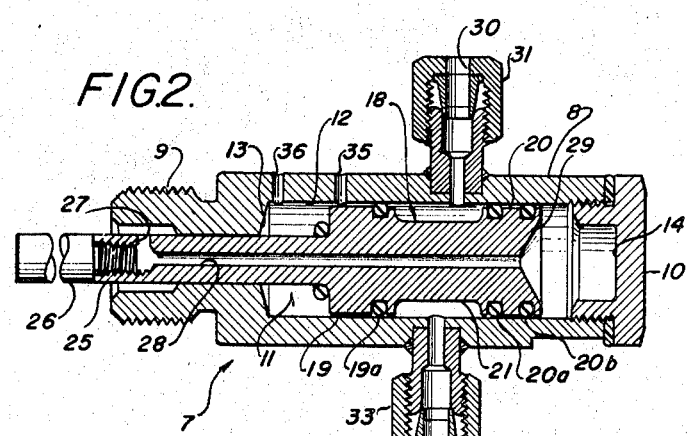
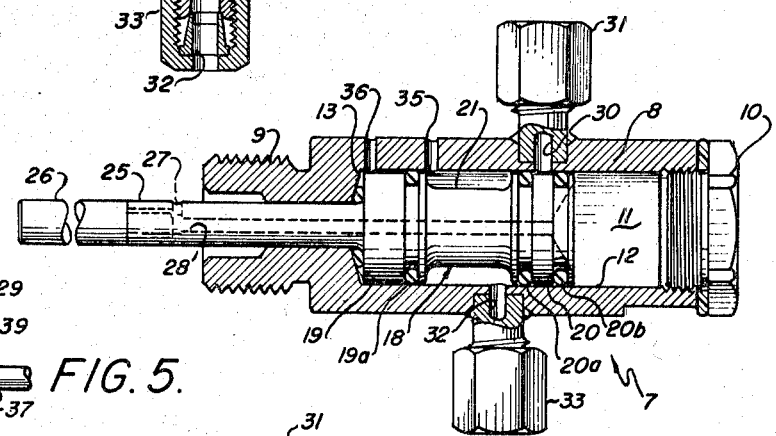
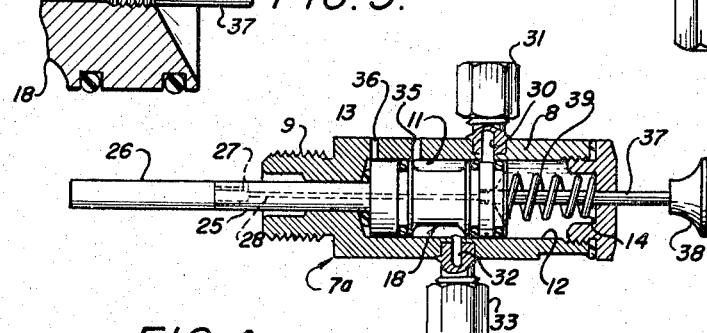
INVENTOR
CARL R. MILLS

INVENTOR
CARL R. MILLS 3,563,273

ACTUATOR VALVE

FIELD OF INVENTION

The actuator valve of this invention is of the type used to control fluid lines for governing the operation of fluid-operated apparatus with which it may be associated. The actuator valve may be connected so that it may be physically actuated by a moving solid object, such as a piston or booster, to effect changes in fluid line connections to control system operation.

SUMMARY OF THE INVENTION

The improved actuator valve of this invention is unique in that the actuator operation is substantially independent of the fluid pressure used to cycle a cylinder or booster. The actuator valve will not prematurely shift by a buildup of pressure on the valve.

The actuator valve has a positive shifting action in that it is basically a momentary impulse valve. No matter what strikes the actuating stem of the valve, be it piston or other moving device, the valve spool will not return or shift position until a main control and/or power valve has been shifted.

Most prior art actuator valves will not operate at above 125 p.s.i., or below 20 p.s.i. to 40 p.s.i. The actuator valve of this invention will shift positively at any pressure rating up to 400 p.s.i. to 500 p.s.i. In fact, the higher the pressure, the more positive the actuator operates. The actuator valve will also shift at as low a pressure as 2 p.s.i. continuously, regardless of the speed or movement of the cylinder or booster. In its preferred embodiment, the actuator valve has no springs to fatigue or break or slow down valve cycle performance.

The present actuator valve, being of simple design, assembles easily without being readily subject to manufacturing errors. Additionally, the simplicity of the design does not require more than a drilled and tapped hole to fit into any air operated device.

Moreover, the present actuator valve will not wear out as quickly as many prior art designs, because there is no resistance on the valve spool, other than friction, until the piston to be controlled is moving in the same direction and approximately the same speed as the actuator valve spool.

BRIEF DESCRIPTION OF THE DRAWINGS

In order that the valve structure for attaining the objects of this invention may be readily understood, reference is made to the drawings wherein:

FIG. 1 is a perspective view of the actuator valve of this invention;

FIG. 2 is a sectional view taken along line 2—2 of FIG. 1 in which the stem and spool are in the "open" valve position so that the air supply port communicates with the cylinder or pilot port;

FIG. 3 is a sectional view of the valve of FIGS. 1 and 2 in which the stem and spool are in the "closed" valve position so that the cylinder or pilot port communicates with the exhaust port;

FIG. 4 is a modification of the actuator valve of FIGS. 1 2 and 3 incorporating a spring and a manual actuating rod to enable manual starting of the valve by a mechanical spring return;

FIG. 5 is a detailed partial view of the valve of FIG. 4 showing a necessary modification;

DETAILED DESCRIPTION OF ACTUATOR VALVE

Figure 6:
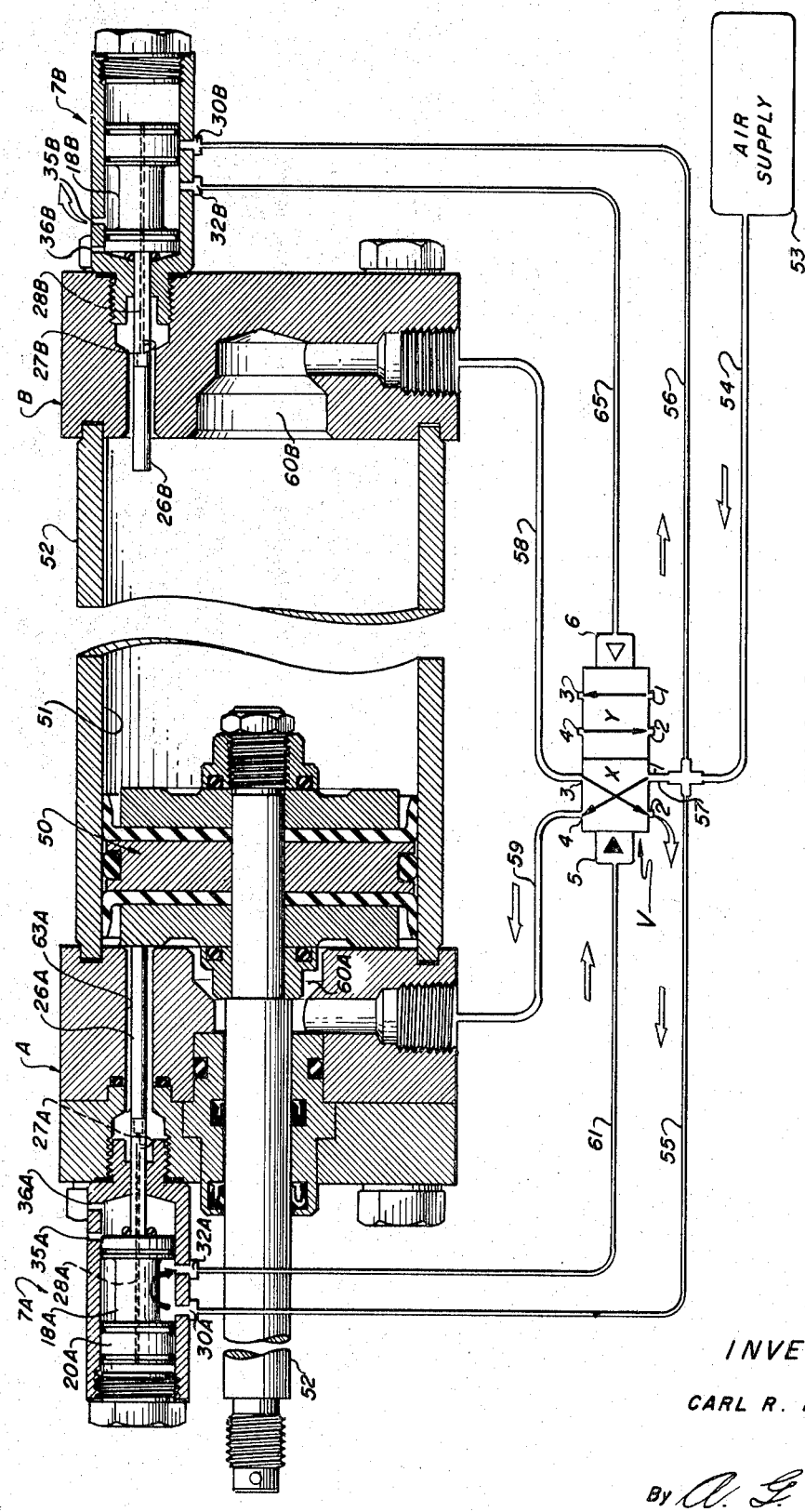
FIG. 6 is a cylinder piston system shown partially in schematic and partially in sectional view, employing a pair of the actuator valves of FIGS. 1—3 to effect sequence control of the piston-cylinder.

Referring now to FIGS. 1 through 3 of the drawings, the actuator valve 7 of this invention comprises a cylinder body 8 formed with an externally threaded projecting shank 9 at one end. The other end of the cylinder body is internally threaded to receive a threaded end cap 10.

Cylinder cavity 11 is defined by a cylindrical sidewall 12, a tapered end wall 13, and an end wall 14 formed by the inside configuration of end cap 10.

Cylinder spool 18 is located within cavity 11. Spool 18 includes a pair of separated lands 19 and 20 connected by intermediate land connector 21. O-ring 19a seals land 19 relative sidewall 12, and O-rings 20a and 20b seal land 20 relative sidewall 12.

Actuating stem 25 projects from shank portion 9, and as is shown in FIGS. 1 and 3 stem extension tip 26 is coupled to actuating stem 25.

Actuating stem 25 is formed with actuator piston supply port 27 which communicates with elongated bore 28. The right end of bore 28 terminates at a tapered or concave end wall 29 for land 20.

An air supply port 30 is defined by tube connector 31, and a cylinder port 32 is defined by tube connector 33. As will be hereinafter outlined in detail with reference to the fluid control system of FIG. 6, port 30 is connected to an air supply, and cylinder port 32 is connected to a pilot control valve.

Cylinder 8 is also formed with an exhaust port 35 and a relief vent 36.

Cylinder spool 18 is inserted within cylinder 8 by removing end cap 10.

Referring to FIG. 2, spool 18 assumes an intermediate position within cavity wall 11. As will be outlined in detail hereinafter, this spool position was attained by the passage of air through actuator piston supply port 27 and bore 28 so that air pressure could be exerted against tapered end wall 29 to drive the spool to the left to cause actuating stem 25 to project to a greater extent from shank 9.

In the position shown in FIG. 2, air supply port 30 communicates with cylinder port 32, and ports 30 and 32 are both isolated from exhaust port 35 because of the seal provided by land 19 and O-ring 19a.

In FIG. 3, spool 18 is driven to rest adjacent end wall 13, and relief vent 36 provides the necessary venting of that portion of cavity 11 contained between end wall 13 and land 19. In the spool position shown in FIG. 3, port 30 is isolated from port 32 by means of land 20 and O-rings 20a and 20b. However, cylinder port 32 communicates with exhaust port 35 with this positioning of spool 18.

When extension 26 is driven to the right by means of a piston as hereinafter explained, spool 18 ultimately assumes a position which will permit an air supply to port 27 and bore 28 to again drive spool 18 to the left as previously explained.

FIGS. 4 and 5 show a modification of the basic valve construction of FIGS. 1 through 3. This modification permits manual actuation of the control valve to a starting position.

Structurally the modification comprises a manual actuating rod 37 which projects through cap 10, and the left end of the rod is coupled to land 20. Rod 37 is reciprocated by a manual application of force to knob 38. Helical spring 39 encircles rod 37, and the terminal ends of this spring rest against tapered end wall 29 of land 20 and end wall 14 of cap 10. The force exerted by spring 39 tends to drive spool 18 to its leftmost position as is shown in FIG. 4, so that the air supply port 30 is isolated from cylinder port 32 by means of land 20.

In the event manual starting of a fluid control system is desired, the manual application of force to knob 38 in a right direction so that spring 39 is compressed and air supply port 30 communicates with cylinder port 32, then a fluid control system is set to a starting point. As is shown in FIG. 5, stem 37 threads into spool land 20, thus blocking bore 28.

FIG. 6 is a typical cylinder piston system employing a pair of the actuator valves shown in FIGS. 1 through 3 to effect sequence control. In particular, air driven piston 50 reciprocates within cavity 51 defined by cylinder 52 under the control of actuator valves 7A and 7B. The left end of cylinder 52 capped by cylinder head A has a threaded bore to receive actuator valve 7A. The right end of cylinder 52 is capped by cylinder head B which also has a threaded bore to receive actuator valve 7B. Stem extensions 26A and 26B pass through the respective bores of cylinder heads A and B so that the terminal ends of these extension stems come into contact with the faces of piston 50 generally at the end of the stroke of piston 50.

The use of a spring eliminates the need for air, when it is not available or present, to return spool 18 to the position of FIG. 3 at which port 30 is blocked from port 32. Accordingly, bore 28 and port 27 are actually not needed in the modification of FIGS. 4 and 5.

Piston rod 52 is coupled to piston 50 in a conventional manner by passing through cylinder head A so that reciprocating power is available at the left terminal end of piston rod 52.

Air supply 53 communicates with air supply port 30A by means of conduit 54 and conduit 55. Air supply 53 also communicates with air supply port 30B by means of conduit 54 and conduit 56. The arrows associated with conduits 54, 55 and 56 show the directional air flow for the system of FIG. 6 with the piston 50 positioned as shown.

Air supply 53 also communicates with valve V by means of conduit 54 and conduit 57. Valve V is a two position, four way valve which is air pilot actuated. The schematic representation shown is that of the Joint Industry Conference specification for such a valve. The valve is a momentary impulse valve such that when pilot 5 is subjected to a momentary air impulse, section X of the valve is connected in a manner shown in FIG. 6. In particular port X1 communicates with outlet port X4, and port X3 communicates with exhaust port X2.

When pilot Y6 is subjected to a momentary air impulse, conduit 57 is effectively connected to port Y1 which communicates with outlet port Y3, and port Y4 communicates with exhaust port Y2. When section Y of valve V is actuated, conduit 58 is effectively disconnected from port X3 and is effectively connected to port Y3, and conduit 59 is effectively disconnected from port X4 and is effectively connected to port Y4.

Now assuming a continuous reciprocating cycle of piston 50 in which the piston assumes the position shown in FIG. 6, air from air supply 53 passes through conduit 54, conduit 57, port X1 to port X4, conduit 59, passage 60A to apply a reciprocating force to the left face of piston 50. To attain this position of piston 50 and also valve V, air previously traveled through conduit 54, conduit 55, air supply port 30A to cylinder port 32A, and conduit 61 to apply a momentary air impulse to pilot X5 to actuate valve V to its X position.

The force applied to the left face of piston 50 drives the piston from left to right. The portion of cavity 51 to the right of piston 50 is exhausted through passage 60B, conduit 58 and port X3 through exhaust port X2.

At the same time that piston 50 is driven away from contact with cylinder head A, air from passage 60A flows into passage 63A, port 27A and bore 28A to drive spool 18A to the right as previously explained with reference to FIGS. 1 through 3 until such time that port 30A is closed by land 20A, and port 32A is permitted to communicate with exhaust port 35A.

When piston 50 approaches the right terminal portion of its stroke and the right face of piston 50 strikes stem extension 26B, spool 18B is driven to the right. At such times as spool 18B travels sufficiently to the right that port 30B communicates with port 32B, air passing through conduit 56, port 30B, port 32B, and conduit 65 applies a momentary air impulse to pilot Y6 of valve section Y. This activation of the Y section of valve V connects conduit 58 to port Y3, conduit 59 to port Y4, and conduit 57 to port Y1.

With this occurrence, air is applied to the right face of piston 50 through conduit 57, port Y1, port Y3, conduit 58, passage 60B to force the piston to reciprocate to the left.

As piston 50 starts to reciprocate to the left and loses contact with the left face of cylinder head B, air from passage 60B flows into port 27B, bore 28B to start spool 18B on a reciprocation to the left, thus port 30B is ultimately closed from port 32B, and port 32B is exhausted through exhaust port 35B.

The portion of the cycle previously described with reference to actuator valve 7A is thus repeated to establish a continuous reciprocation. The fluid control system of FIG. 6 is merely illustrative of one of the many types of systems in which the simplified actuator valve of this invention may be employed.

I claim:

1. A three-way actuator valve for use in sequence control of fluid apparatus comprising a cylinder body having end and sidewalls defining an elongated cylinder cavity, a cylinder spool positioned within the cylinder cavity for reciprocating motion along the axis of cavity elongation, the cylinder spool including a pair of spool lands in friction contact with the inside sidewall of the cylinder body with the lands separated by an intermediate land connector of reduced diameter, an actuating stem projecting through one of said end walls and fixed to the cylinder spool for reciprocating motion with an actuator piston supply port being formed in a portion of the stem exterior the cylinder and communicating with an elongated bore passing through the stem and the spool and leading to a cavity defined by the opposite end wall whereby a pressure may be developed within the latter cavity and exerted against the spool to return the stem to a maximum projection position relative the cylinder, and a supply port, a cylinder port and an exhaust port formed in the cylinder sidewall and located so that only the supply and cylinder ports communicate with one another in one position of the spool and that only the cylinder and exhaust ports communicate with one another in a second position of the spool.

2. The valve of claim 1 in which the face of the spool adjacent the opposite end wall is tapered to form a cavity therebetween when the spool is inserted within the cylinder cavity.

3. The valve of claim 2 in which the opposite end wall is a removable cap which when removed enables insertion of the spool within the cylinder cavity.

4 The valve of claim 3 in which the interior surface of the first end wall is tapered to define a relatively small cavity when the actuating stem is at maximum projection from the cylinder, and which cavity is vented by a relief vent.

5. A three-way momentary impulse actuator valve for use in sequence control of fluid apparatus comprising a cylinder body having end and sidewalls defining a cylinder cavity, a cylinder spool positioned within the cylinder cavity for reciprocating motion within the cavity, the cylinder spool including a pair of projecting spool lands in friction sealing contact with the inside sidewall of the cylinder body with each of the lands being separated by an intermediate land connector of reduced diameter, an actuating stem projecting through one of said end walls and fixed to the cylinder spool for reciprocating motion with an actuator piston supply port being formed in a portion of the stem exterior the cylinder and communicating with an elongated bore passing through the stem and the spool and leading to a cavity defined by the opposite end wall whereby a pressure may be developed within the latter cavity and exerted against the spool to return the stem to a maximum projection position relative the cylinder, and three ports passing through the sidewall to communicate with the cylinder cavity, the three ports being displaced along the axis of reciprocation of the cylinder with one port communicating internally and exclusively with the second port by the portion of the cavity isolated between the spool lands when the spool is driven by the actuating stem so that the stem is substantially received by the cylinder body, and the one port communicating exclusively internally with the third port by the portion of the cavity isolated between the spool lands when the spool is driven by pressurized fluid passing through the bore of the stem and spool to drive the actuating stem outwardly from the cylinder body.

6. The valve of claim 5 in which the one end wall and the spool define a cavity which is vented when the stem is driven outwardly to maximum projection relative the cylinder body.